United States Patent
Saukkio

(10) Patent No.: US 12,090,857 B2
(45) Date of Patent: Sep. 17, 2024

(54) ELECTRIC VEHICLE AND ELECTRIC MOTORCYCLE

(71) Applicant: RMK VEHICLE CORPORATION OY, Seinäjoki (FI)

(72) Inventor: Teemu Saukkio, Turku (FI)

(73) Assignee: Verge Motorcycles Oy, Helsinki (FI)

( * ) Notice: Subject to any disclaimer, the term of this patent is extended or adjusted under 35 U.S.C. 154(b) by 731 days.

(21) Appl. No.: 17/256,274

(22) PCT Filed: Jun. 27, 2019

(86) PCT No.: PCT/FI2019/050503
§ 371 (c)(1),
(2) Date: Dec. 28, 2020

(87) PCT Pub. No.: WO2020/002774
PCT Pub. Date: Jan. 2, 2020

(65) Prior Publication Data
US 2021/0260987 A1    Aug. 26, 2021

(30) Foreign Application Priority Data

Jun. 28, 2018   (FI) ...................................... 20185594

(51) Int. Cl.
*B60K 7/00*    (2006.01)
*B60K 26/02*   (2006.01)
(Continued)

(52) U.S. Cl.
CPC ............ *B60K 7/0007* (2013.01); *B60K 26/02* (2013.01); *B62K 11/14* (2013.01); *B62M 7/12* (2013.01);
(Continued)

(58) Field of Classification Search
CPC .................. B60K 7/0007; B60K 26/02; B60K 2026/025; B62K 11/14; B62M 7/12;
(Continued)

(56) References Cited

U.S. PATENT DOCUMENTS 10,464,633 B2 *  11/2019  Zhu .......................... B62M 11/02
2003/0010550 A1 *  1/2003  Prucher .................... F16C 32/04
                                                         180/65.51
(Continued)

FOREIGN PATENT DOCUMENTS

AU      2013305694 A1 *  4/2015  .......... B60L 11/1805
CN      204250250 U  *  4/2015
(Continued)

OTHER PUBLICATIONS

Translated JP-2014211230-A (Year: 2023).*
Translated WO-03092142-A1 (Year: 2023).*

*Primary Examiner* — James A Shriver, II
*Assistant Examiner* — Ian Bryce Shelton
(74) *Attorney, Agent, or Firm* — ArentFox Schiff LLP

(57) ABSTRACT

The invention is an electric vehicle (100) or specifically an electric motorcycle (100), which comprises an electric motor (3) mounted on at least one wheel (2), said electric motor (3) comprising a rotor (4) fitted on the outer side and a stator (5) fitted on the inner side. The electric motor's (3) stator (5) is arranged to function as an axle for said wheel (2) in such a way that the stator (5) is adapted to bear the loads between said wheel (2) and the remaining structure of the vehicle (100).

19 Claims, 4 Drawing Sheets

(51) Int. Cl.
  *B62K 11/14*   (2006.01)
  *B62M 7/12*    (2006.01)
  *H02K 5/173*   (2006.01)
  *H02K 7/00*    (2006.01)
  *H02K 7/08*    (2006.01)
  *H02K 11/21*   (2016.01)

(52) U.S. Cl.
  CPC ........... *H02K 5/1737* (2013.01); *H02K 7/006* (2013.01); *H02K 7/088* (2013.01); *H02K 11/21* (2016.01); *B60K 2026/025* (2013.01)

(58) Field of Classification Search
  CPC ...... H02K 5/1737; H02K 7/006; H02K 7/088; H02K 11/21; B60Y 2200/12; Y02T 10/72
  See application file for complete search history.

(56) References Cited

U.S. PATENT DOCUMENTS

| | | | |
|---|---|---|---|
| 2011/0209938 A1* | 9/2011 | Basadzishvili | B60K 7/0007 180/305 |
| 2011/0247887 A1* | 10/2011 | Murata | B60B 25/12 180/65.51 |
| 2012/0111137 A1* | 5/2012 | Bliss | B62K 23/04 74/504 |
| 2013/0241366 A1* | 9/2013 | Kim | B60K 7/0007 310/67 R |
| 2015/0129327 A1* | 5/2015 | Yoshino | B62K 1/00 301/5.23 |
| 2018/0222549 A1* | 8/2018 | Ragland | B62J 43/20 |
| 2019/0002056 A1* | 1/2019 | Zhu | H02K 7/006 |
| 2019/0300108 A1* | 10/2019 | David | H02K 15/0407 |

FOREIGN PATENT DOCUMENTS

| | | | | |
|---|---|---|---|---|
| DE | 112009003757 T5 | 2/2013 | | |
| EP | 2154057 A1 | 2/2010 | | |
| JP | 2003300420 A | 10/2003 | | |
| JP | 4109852 B2 * | 7/2008 | ............. | B60L 15/20 |
| JP | 2014211230 A * | 11/2014 | ............. | F16C 19/36 |
| JP | 2017133449 A * | 8/2017 | | |
| WO | WO-03092142 A1 * | 11/2003 | ........... | B60K 7/0007 |
| WO | 2015092743 A2 | 6/2015 | | |
| WO | WO-2016151427 A1 * | 9/2016 | ........... | B60K 7/0007 |
| WO | WO-2017198592 A1 * | 11/2017 | ......... | B60B 27/0047 |

* cited by examiner

ELECTRIC VEHICLE AND ELECTRIC MOTORCYCLE

PRIORITY

This application is a U.S. national application of the international application number PCT/FI2019/050503 filed on Jun. 27, 2019 and claiming priority of FI application number 20185594 filed on Jun. 28, 2018, the contents of all of which are incorporated herein by reference.

TECHNICAL FIELD

The invention relates generally to electric vehicles. The invention relates specifically to an electric motorcycle.

BACKGROUND

There are known electric vehicles with electric motor structures mounted on a wheel of the vehicle in such a way that the motor has its rotating rotor on the outer periphery and coupled directly to rotate the wheel without power transmission in between. A problem with the known solutions is the complexity thereof.

SUMMARY OF THE INVENTION

The invention relates to an electric vehicle and to an electric motorcycle.

It is one objective of the invention to provide an electric vehicle and an electric motorcycle, which are simpler in construction than the known electric vehicles and electric motorcycles.

The objectives of the invention are attained with an electric vehicle and an electric motorcycle as set forth in the respective independent claims. A few preferred exemplary embodiments are presented in the dependent claims.

According to a first aspect, the invention is an electric vehicle which comprises an electric motor mounted on at least one wheel, said electric motor comprising a rotor fitted on the outer side and a stator fitted on the inner side. The electric motor's stator is arranged to function as an axle for said wheel in such a way that the stator is adapted to bear the loads between said wheel and the remaining structure of the electric vehicle.

Similar electric motors may have been included in more than one wheel, for example in two rear wheels, two front wheels, or all wheels of the vehicle. The wheels may have been made turnable or unturnable.

In this disclosure, the electric vehicle may refer for example to an electric automobile, an electric tractor, an electric motorcycle, an electric scooter, an electric moped, an electric bicycle, or a motorcycle resembling three-wheeled electric vehicle, or to any other vehicle which Is provided or can be provided with an electric motor according to one exemplary embodiment of the invention.

Said wheel may comprise a rim base, whose outer periphery is capable of being fitted with a tire, and in which the rotor is included in the rim base, preferably directly in the rim base.

The rotor can be fitted on the stator in a bearing-mounted manner, such as by means of a roller bearing, a needle bearing, a slide bearing, a magnetic bearing or a ball bearing or bearings. The rotor can be mounted on the stator with a roller bearing, the rotational axes of whose rollers are disposed in an unparallel manner with respect to the rotational axis of said wheel. According to one example, the roller bearing may have the rotational axes of its rollers set at an angle of 45 degrees with respect to the rotational axis of said wheel.

Between the rotor and the stator may have been fitted sealings so as to provide a sealed space for the rotor and stator's electromagnetic components. The sealings may have been arranged in such a way that the sealed space is provided both for the rotor and stator's electromagnetic components and for the bearing or bearings.

The stator comprises preferably a winding and the rotor comprises a magnet, such as a permanent magnet or electromagnet. The winding and the magnet may have been arranged peripherally in the stator and the rotor, enabling a magnetic force to be generated therebetween for rotating the rotor relative to the stator as the winding is supplied with electric current.

The widths of the stator's winding and the rotor's magnet in the direction of the wheel rotational axis can be substantially smaller than the width of the wheel.

The electric vehicle may comprise an electric motor control unit and a sensor arrangement, said sensor arrangement being adapted to generate a sensor signal and said control unit being adapted to control operation of the electric motor on the basis of the sensor signal. According to one working example, the sensor arrangement is included in a control element intended for controlling rotation speed of the electric motor, wherein the sensor signal is adapted to change in response to a change of position of the control element.

The control element may refer, among other things, to a steering wheel, a handle which can be squeezable handle or a rotatable handle, a touch screen, a control stick, or the like appropriate control element of a type usable in each exemplary embodiment.

The electric vehicle may comprise at least two wheels, a body, wherein said wheel, in which is incorporated an electric motor, is arranged in attachment with the body by means of a support member. The support member can be configured so as to enable its disassembly into two separate parts with respect to a direction perpendicular to the rotational axis of the wheel.

According to a second aspect, the invention is an electric motorcycle which is an electric vehicle according to the first aspect. The electric motorcycle includes two wheels, one of which, preferably the rear wheel, is provided with an electric motor which comprises a rotor fitted on the outer side and a stator fitted on the inner side. The electric motor's stator is arranged to function as an axle for said wheel in such a way that the stator is adapted to bear the loads between the wheel and the remaining structure of the electric motorcycle.

The electric motorcycle control element can be a handle rotatable around its longitudinal axis, and the sensor arrangement can be fitted in said handle in such a way that the sensor signal is adapted to change in response to a change of position of the handle with respect to its rotational axis. The handle can be similar to a throttle handle included in conventional combustion engine-equipped motorcycles.

The invention provides benefits over the prior art. The electric vehicle and electric motorcycle of the invention are simpler in construction than the known solutions.

Several other benefits of the invention become clear for a skilled artisan on the basis a subsequent detailed description dealing with a few exemplary embodiments of the invention.

A few exemplary embodiments of the invention as described hereinafter may not be construed in a limited sense as it is obvious for a skilled artisan that the invention can also be implemented in ways other than those presented below.

BRIEF DESCRIPTION OF THE FIGURES

A few exemplary embodiments of the invention will now be described in detail with reference to the accompanying figures.

DETAILED DESCRIPTION OF A FEW EXEMPLARY EMBODIMENTS

Figure 1A:
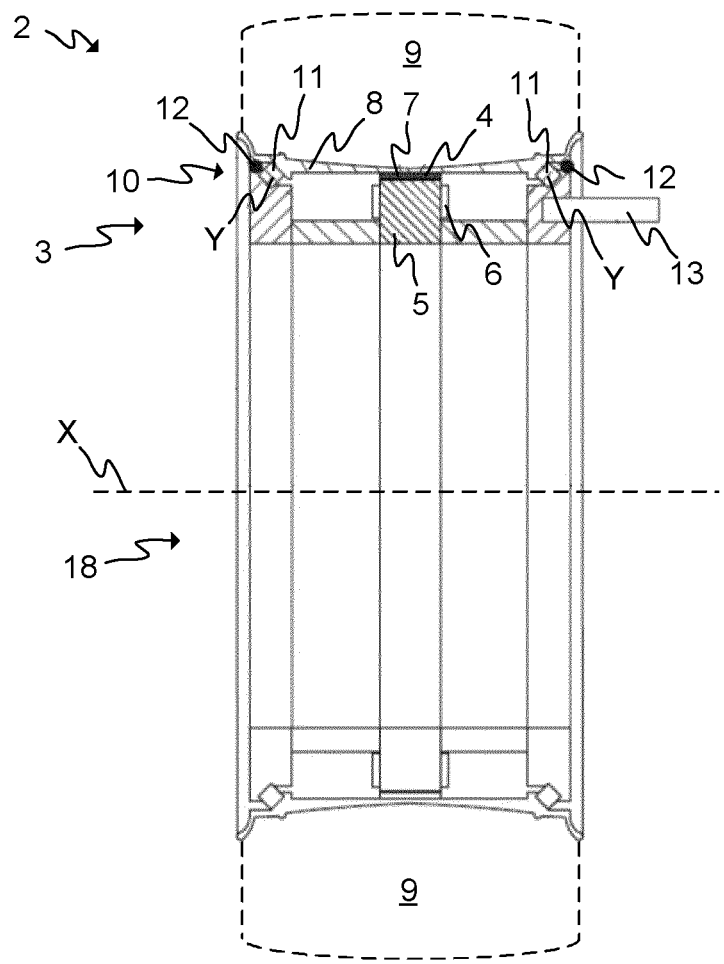
FIGS. 1A and 1B show schematically an electric motor for an electric vehicle according to one exemplary embodiment of the invention.
Figure 1B:
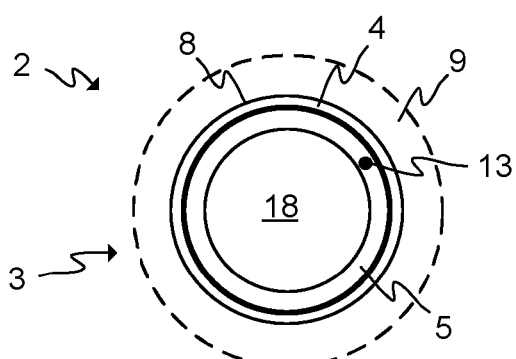

FIGS. 1A and 1B illustrate schematically an electric motor 3 for an electric vehicle 100 according to one exemplary embodiment of the invention: FIG. 1A in a cross-section view and FIG. 1B in a side view. Said electric motor 3 may comprise a rotor 4 disposed on the outer side and an annular stator 5 disposed on the inner side. The electric motor 3 can be a type of brushless or brushed, alternating current or direct current motor.

According to one exemplary embodiment of the invention, the electric motor's stator 5 is arranged to function as an axle for a wheel 2 in such a way that the stator 5 is adapted to bear the loads between said wheel 2 and the remaining structure, such as a support member 60 and/or a body 50, of an electric vehicle 10. Hence, in the discussed wheel 2 there is no need for a separate hub, whereby the wheel 2 may have a middle part which comprises a void space 18 but which may also be provided as a solid structure. The stator 5 mountable with attaching means 13 to the remaining structure of the vehicle. The attaching means 13 is a per se known fastener which enables detachment and reattachment of the stator and the entire electric motor, such as for example a bolt. On the other hand, the attaching means 13 can be a welded joint or adhesive bonding which must be broken in order to detach the stator 5 and the electric motor.

According to one exemplary embodiment of the invention, the stator 5 can be irremovably attached to a body of the vehicle 100 at least from what is the other side of the stator 5 with respect to a lateral direction X of the wheel 2.

In the embodiment shown in FIG. 1A, the stator 5 comprises a winding 6 formed with winding wires, while the rotor 4 comprises magnets 7, preferably permanent magnets or electromagnets. In the embodiment shown in FIG. 1A, the widths of the stator winding 6 and the rotor magnet 7 in the direction of a rotational axis X of the wheel are substantially smaller than the width of the wheel.

In the exemplary embodiment shown in FIG. 1A, the wheel 2 comprises a rim base 8 and a tire 9 (presented with dashed lines) disposed thereon, and the rotor 4 is attached directly to the rim base 8. Attachment of the rotor 4 to the rim base 8 can be effected by using conventional attachment methods and fasteners.

In another embodiment there are one or more structural layers between the rotor 4 and the rim base 8. Such a structural layer can be functional, whereby it may for example dampen vibrations between the rotor and the rim base or serve as an element to assist attachment between the rotor 4 and the rim base 8, or as the like element.

The tire 9, which is provided or capable of being provided on the wheel 2, can be a per se known tire: an air-filled, solid, foam-filled tire, or the like. Neither is a separate tire 9 necessary but, instead, the rim base 8 may constitute a tread surface upon which the wheel 2 rotates on a driving surface.

The rotor 4 is preferably adapted to be rotatable relative to the stator 5, specifically rotatable around an outer periphery of the stator 5. The rotor 4 can be arranged on the stator 5 in a bearing-mounted fashion, such as by means of a roller bearing 10, a needle bearing 10, a slide bearing 10, a magnetic bearing 10 or bearings 10.

The bearing assembly can be dimensioned preferably in such a way that the stator 5 functions as an axle for the wheel 2, which is capable of bearing the entire load transmitted by way of the wheel 2 of an electric vehicle 100 to the driving surface. In other words, the bearing assembly between the rotor 4 and the stator 5 works as a sole wheel bearing for the wheel 2. In the embodiment shown in FIG. 3A, between the rotor 4 and the stator 5 are disposed sealings 12 so as to generate a sealed space for electromagnetic components of the rotor 4 and the stator 5. The sealings 12 may have been arranged so as to provide a sealed space for the bearing 10 or bearings 10. Alternatively, the sealings 12 may have been arranged so as to provide a sealed space both for electromagnetic components of the rotor 4 and the stator 5 and for the bearing 10 or bearings 10.

In the embodiment shown in FIG. 1A, the rotor 4 is bearing-mounted to the stator 5 with a roller bearing 10, having rotational axes Y of its bearing rollers 11 disposed to be divergent with respect to a rotational axis X o the wheel. The benefit is that the bearing assembly is supported both in the direction of the rotational axis X of the wheel 2 and in a direction perpendicular thereto. In the present case, said angle is 45 degrees, but may of course be other than that.

Figure 2A:
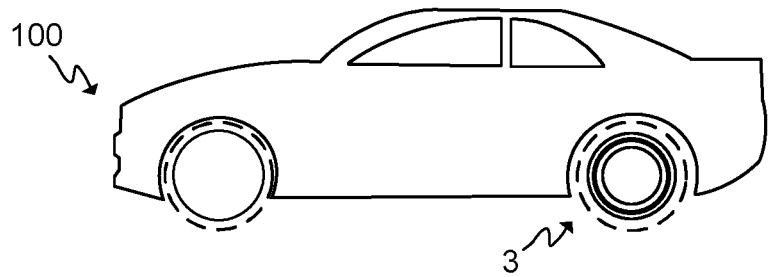
FIGS. 2A-2D show schematically some electric vehicles according to a few exemplary embodiments of the invention.
Figure 2B:
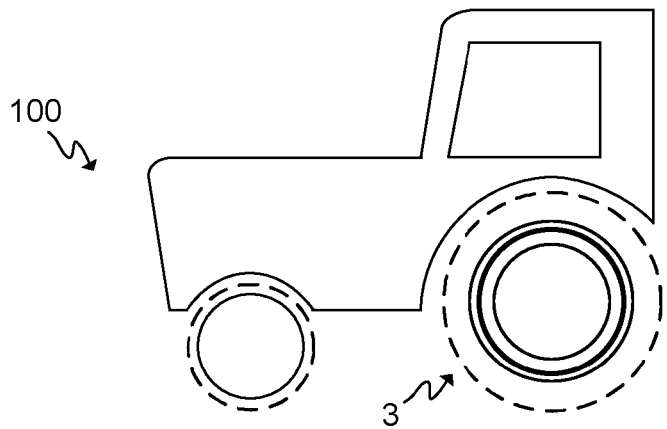
Figure 2C:
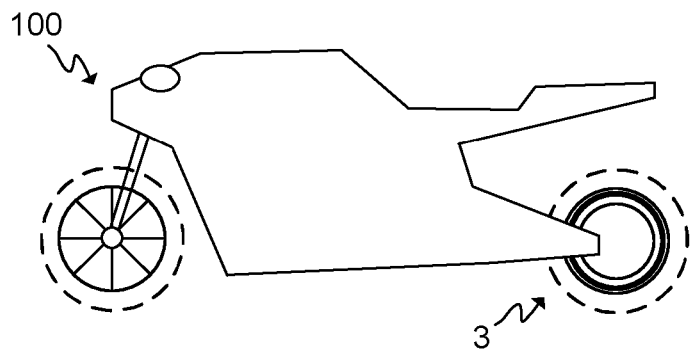
Figure 2D:
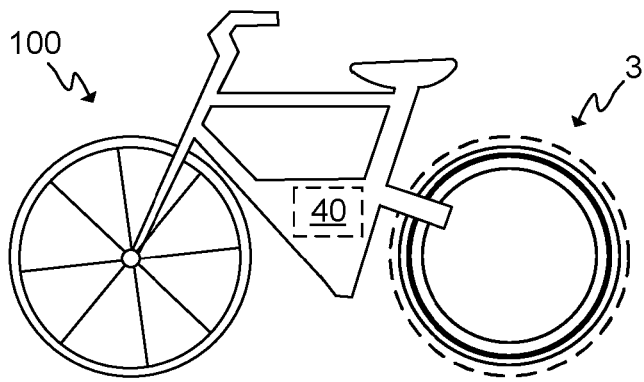

FIGS. 2A-2D illustrate schematically some electric vehicles according to a few exemplary embodiments of the invention. FIG. 2A depicts an electric passenger car. According to a few exemplary embodiments of the invention, the electric vehicle may also be a van, a bus, a truck, or a trailer truck. FIG. 2B depicts an electric tractor. According to a few exemplary embodiments of the invention, the electric vehicle may also be another type of working machine, such as a forklift, a combine harvester, or an excavator. FIG. 2C depicts an electric motorcycle according to one exemplary embodiment of the invention. FIG. 2D depicts an electric bicycle according to one exemplary embodiment of the invention, which comprises an electric energy storage 40 such as a battery or a battery bank.

Figure 3:
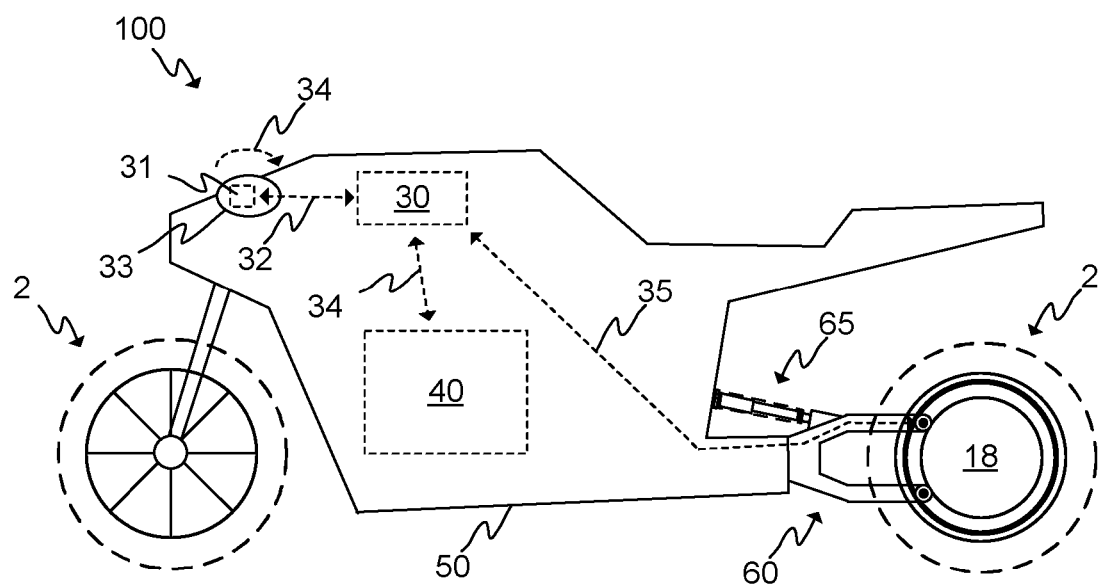
FIG. 3 shows schematically an electric vehicle according to one exemplary embodiment of the invention, specifically an electric motorcycle.

FIG. 3 presents schematically an electric vehicle 100 according to one exemplary embodiment of the invention, specifically an electric motorcycle 100. The electric motorcycle may comprise an electric motor 3, which is included in at least one wheel 2 and comprises a rotor 4 disposed on the outer side and a stator 5 disposed on the inner side. The electric motor 3 has its stator 5 preferably arranged to function as an axle for the wheel 2 in such a way that the stator 5 is adapted to bear the loads between said wheel 2 and the remaining structure of the electric motorcycle 100. Therefore, the discussed wheel 2 does not require a separate hub.

According to one exemplary embodiment of the invention, the electric vehicle 100 or the electric motorcycle 100 may comprise a control unit 30 for the electric motor 3. The electric motorcycle 100 may comprise a sensor arrangement 31 adapted to produce a sensor signal 32. The control unit 30 may have been adapted to control operation of the electric motor 3 on the basis of the sensor signal 32. The sensor arrangement 31 may have been arranged in a control element 33, intended for controlling rotation speed of the electric motor 3, in such a way that the sensor signal 32 is adapted to change as the position of the control element 33 changes with respect to its rotational axis. The change of position of a control element 33 according to one exemplary embodiment has been denoted with reference numeral 34. The control element 33 can be a steering wheel, a stick, a touch screen, or for example similar to a throttle handle included in prior known combustion engine-equipped motorcycles. The sensor arrangement 31 can be based on measuring a force applied to the control element 33 or it can be a position sensor.

According to one exemplary embodiment of the invention, the electric motorcycle's 100 control element 33 is a handle 33 rotatable around its longitudinal axis, and wherein sensor arrangement 31 is adapted to change in response to a change of position of the handle 33 with respect to its rotational axis.

According to one exemplary embodiment of the invention, the electric vehicle or the electric motorcycle can be without a sensor arrangement.

According to several exemplary embodiments of the invention, control unit 30 for the electric motor 3 is electrically connected 35 to the electric motor 3 for controlling operation of the electric motor 3.

The electric vehicle 100 or the electric motorcycle 100 may comprise an electric energy storage 40 such as a battery or a battery bank.

The control unit 30 for the electric motor 3 of the electric vehicle 100 or the electric motorcycle 100 may comprise a computing unit such as a microcontroller or a processor. The control unit 30 may further comprise memory capable of being stored with some program code which can be executed with the computing unit. According to several exemplary embodiments of the invention, the control unit 30 comprises a frequency converter or an inverter for modifying electric power to be delivered to the electric motor 3. The electric power can be preferably supplied from the electric energy storage 40. In addition, the electric motor 3 may have been provided with sensors such as speed or position sensors and, optionally, among other things, with temperature sensors and sensors measuring other parameters of the electric motor. The control unit 30 is preferably adapted to measure a current supplied to the electric motor 3 and a voltage connected to the poles of the electric motor 3. In addition, the control unit 3 may be adapted to measure the current and/or voltage and/or output of the electric energy storage 40

The electric vehicle 100 or the electric motorcycle 100 can have its wheel 2 mounted to a body 50 of the vehicle 100 or the electric motorcycle 100 by means of a support member 60. The support member 60 may comprise, among other things, a suspension 65 and/or shock absorption 65.

The stator 5 can be attached to the remaining structure of an electric vehicle 100 or an electric motorcycle 100 from one side thereof (as presented in FIG. 1A), from both sides thereof (as presented in FIGS. 4, 5A and 5B), or from the direction of a void space 18 created by an inner periphery of the annular stator 5, or by various combinations of these. Further, the stator 5 may be attached across the entire length of its side or inner periphery, or, alternatively, just across part of the length of its side or inner periphery. In other words, the attaching means 13 can be disposed all around the stator 5 or on just a certain part or sector thereof.

Figure 4:
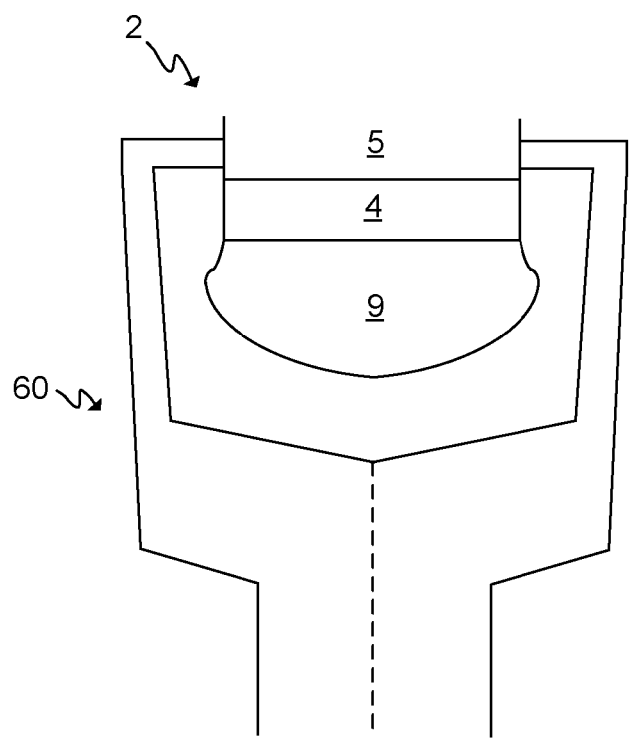
FIG. 4 shows schematically a portion of the electric vehicle or electric motorcycle according to one exemplary embodiment of the invention.

FIG. 4 shows schematically a part of the electric vehicle 100 or the electric motorcycle 100 according to one exemplary embodiment of the invention. In FIG. 4 is depicted a support member 60 provided for the attachment of a wheel 12 to the body 50. As can be observed from FIG. 2, the stator 5 mounted on the wheel 2 can have the support member 60 attached thereto from both sides of the stator 5 in a lateral direction of the wheel 2. According to a few exemplary embodiments of the invention, the support member 60 can be a one-piece/part article or alternatively it is constructed from several pieces, whereby it can be opened up or taken apart, enabling thereby an easier removal of the wheel 2. In FIG. 4 is optionally presented a dashed line, indicating a part at which the two-piece support member 60 can be opened up or taken apart. The discussed pieces can be attached or attachable to each other with fasteners such as bolts and, if necessary, nuts. The support member 60 may have been constructed as a one-piece/-part article by welding two or more pieces to each other.

In another exemplary embodiment, the stator 5 is attached to the support member 60, which is intended for the wheel 2 of an electric vehicle 100 or an electric motorcycle 100, and which can be suspended and/or shock absorbed 65 relative to the remaining body 50 of the electric vehicle 100 or the electric motorcycle 100.

Figure 5A:
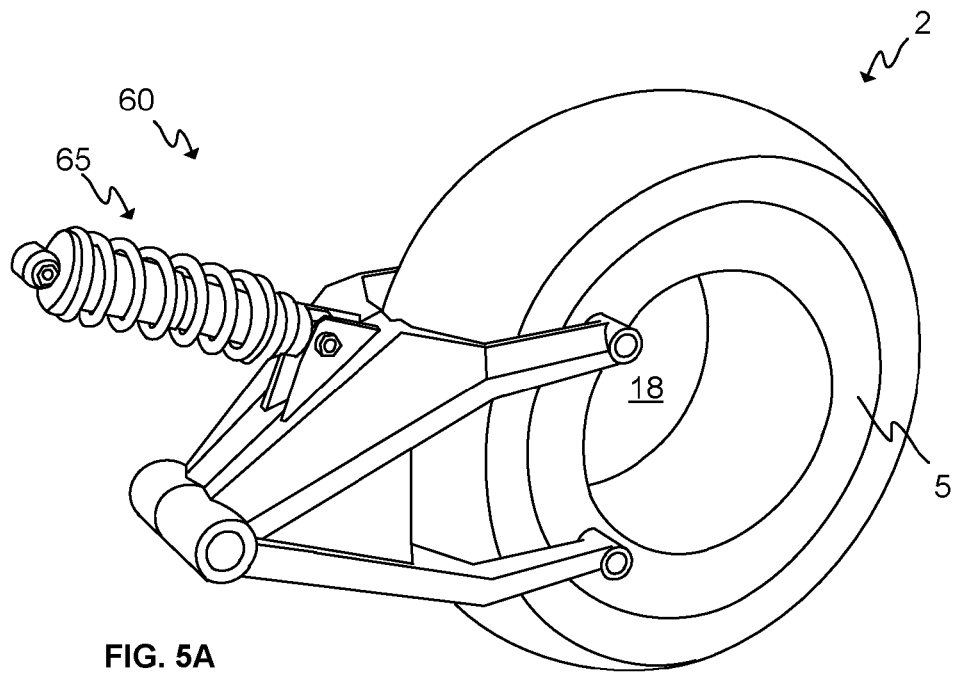
FIGS. 5A and 5B show schematically a wheel support member for the electric vehicle or electric motorcycle according to one exemplary embodiment of the invention.
Figure 5B:
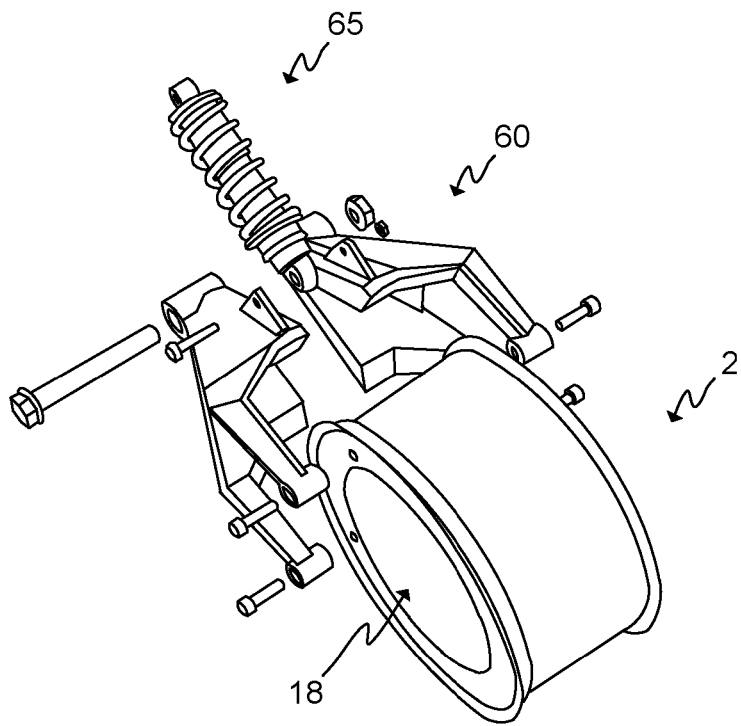

FIGS. 5A and 5B illustrate schematically a support member 60 for the wheel 2 of an electric vehicle 100 or an electric motorcycle 100 according to one exemplary embodiment of the invention. FIGS. 5A and 5B present a support member 60 according to one exemplary embodiment of the invention, which is constructed from at least two pieces detachable from each other. The support member 60 may have been provided, among other things, with a suspension 65 and/or shock absorption 65, by means of which the support member 60 can be additionally or optionally attached to the body 50 of the electric motorcycle 100.

The figures and the description related thereto are only intended to elucidate the concept of the invention. It is obvious for a ski artisan that the invention is not limited to the foregoing embodiments in which the invention has been described by way of a few examples but, instead, a multitude of modifications and various applications of the invention are feasible within the scope of the inventive concept as defined in the subsequently presented claims.

The invention claimed is:

1. An electric vehicle which comprises an electric motor mounted on at least one wheel of the electric vehicle, said electric motor comprising a rotor fitted on an outer side and a stator fitted on an inner side, the outer and inner sides being aligned in a perpendicular direction relative to a direction of a rotational axis of the at least one wheel, wherein the stator of the electric motor is arranged to function as an axle for said at least one wheel in such a way that the stator is adapted to bear loads between said at least one wheel and a remaining structure of the electric vehicle, which the electric vehicle comprises at least two wheels and a body, wherein said at least one wheel, on which the electric motor is provided, is arranged in attachment with the body by means of a support member, the support member comprising a support member attachment portion adapted to be attached to the body so that the support member attachment portion is between portions of the body in the direction of the rotational axis, and wherein the support member is:

configured so as to enable its disassembly into at least two separate pieces relative to a direction perpendicular to the rotational axis of said at least one wheel, wherein the at least two separate pieces are further arranged to be attached to each other at portions of the at least two separate pieces to be arranged between the body and said at least one wheel, and attached to sides of the stator on both sides of said at least one wheel in the direction of the rotational axis so that there are at least two attaching points on each of said both sides of the at least one wheel, wherein one of the at least two attaching points on either of said sides is arranged on a first side of a first plane defined by the rotational axis and an imaginary line between the support member attachment portion and the rotational axis, and another one of the at least two attaching points on either of said sides is arranged on an opposite side of the first plane relative to the first side, wherein the at least two attaching points are further arranged on a portion of the stator which is on a side of a second plane having the support member attachment portion, the second plane being perpendicular to the first plane and extending via the rotational axis.

2. The electric vehicle according to claim 1, wherein said wheel comprises a rim base, whose outer periphery is capable of being provided with a tire, and wherein the rotor is mounted on the rim base.

3. The electric vehicle according to claim 1, wherein the rotor is provided on the stator in a bearing-mounted fashion.

4. The electric vehicle according to claim 3, wherein the rotor is bearing-mounted on the stator with a roller bearing, whose rollers have rotational axes thereof adapted to be divergent with respect to a rotational axis of said wheel.

5. The electric vehicle according to claim 4, wherein the roller bearing have the rotational axes of its rollers set at an angle of 45 degrees with respect to the rotational axis of said wheel.

6. The electric vehicle according to claim 1, wherein between the rotor and the stator are fitted sealings so as to generate a sealed space for electromagnetic components of the rotor and the stator.

7. The electric vehicle according to claim 1, wherein the stator comprises a winding, and the rotor comprises a magnet.

8. The electric vehicle according to claim 7, wherein the winding of the stator and the rotors magnet have widths which, in the direction of rotational axis of the wheel, are substantially smaller than the width of the wheel.

9. The electric vehicle according to claim 1, which comprises a control unit for the electric motor and a sensor arrangement, said sensor arrangement being adapted to generate a sensor signal and said control unit being adapted to control operation of the electric motor on a basis of the sensor signal.

10. The electric vehicle according to claim 9, wherein the sensor arrangement is fitted in a control element intended for controlling rotation speed of the electric motor, wherein the sensor signal is adapted to change as a position of the control element changes.

11. The electric vehicle according to claim 1, which is an electric automobile.

12. An electric motorcycle, which is an electric vehicle according to claim 1.

13. The electric motorcycle according to claim 12, comprising a control element, wherein the control element is a handle rotatable around its longitudinal axis, and a sensor arrangement is fitted in said handle, said sensor arrangement being adapted to generate a sensor signal and a control unit being adapted to control operation of the electric motor on a basis of the sensor signal, wherein the sensor signal is adapted to change in response to a change of position of the handle with respect to its rotational axis.

14. The electric vehicle according to claim 1, which is an electric tractor.

15. The electric vehicle according to claim 1, which is an electric motorcycle.

16. The electric vehicle according to claim 1, which is an electric scooter.

17. The electric vehicle according to claim 1, which is an electric moped.

18. The electric vehicle according to claim 1, which is an electric bicycle.

19. The electric vehicle according to claim 1, which is a motorcycle resembling three-wheeled electric vehicle.

* * * * *